United States Patent [19]

Langerbeins et al.

[11] Patent Number: 5,071,902
[45] Date of Patent: Dec. 10, 1991

[54] AQUEOUS SYNTHETIC RESIN DISPERSIONS

[75] Inventors: Klaus Langerbeins, Langen; Herbert Fink, Bickenbach; Wolfgang Klesse, Mainz; Dieter Tessmer, Ruesselheim, all of Fed. Rep. of Germany

[73] Assignee: Röhm GmbH, Darmstadt, Fed. Rep. of Germany

[21] Appl. No.: 468,570

[22] Filed: Jan. 23, 1990

[30] Foreign Application Priority Data

Jan. 25, 1989 [DE] Fed. Rep. of Germany ........ 3902067

[51] Int. Cl.$^5$ ............................ C08F 2/16; C08K 3/20
[52] U.S. Cl. ................................... 524/458; 524/460; 524/813; 524/831; 523/223; 526/302
[58] Field of Search ................... 524/813, 458, 831; 523/223; 526/302

[56] References Cited

U.S. PATENT DOCUMENTS 4,455,342  6/1984  Fink et al. ........................... 428/265
4,473,678  9/1984  Fink et al. ........................... 524/211

FOREIGN PATENT DOCUMENTS 0080653  11/1986  European Pat. Off. .
0143175   1/1987  European Pat. Off. .
3202093   8/1983  Fed. Rep. of Germany .

*Primary Examiner*—Paul R. Michl
*Assistant Examiner*—J. McDonald, Jr.

[57] ABSTRACT

A film-forming, self-crosslinking aqueous synthetic resin dispersion with reduced liberation of formaldehyde contains an emulsion polymer composed of (A) a major portion of an ethylenically unsaturated, free radically polymerizable monomer giving a polymer or copolymer with a glass transition temperature not exceeding 120° C., (B) N-methylolacrylamide or methacrylamide, (C) optionally further ethylenically unsaturated, free radically polymerizable monomers, and (D) an ethylenically unsaturated, free radically polymerizable monomer carrying a ureido group.

8 Claims, No Drawings

AQUEOUS SYNTHETIC RESIN DISPERSIONS

The present invention relates to a film-forming, self-crosslinking aqueous synthetic resin dispersion and to a method for making the same. More in particular, the invention relates to a reduction in the liberation of formaldehyde from such dispersions.

A resin dispersion is regarded as film-forming if, when applied as a thin coat to a rigid substrate at a temperature between 0° C. and 120° C., it dries to form a continuous film, possibly after the addition of a film-forming aid.

THE PRIOR ART

The finishing and strengthening of fibrous aggregates such as fabrics, nonwovens, and wadding made of textile fibers or yarns by impregnation with self-crosslinking aqueous synthetic resin dispersions is generally known. As a rule, these dispersions contain units of N-methylolamides of acrylic acid and/or methacrylic acid, incorporated by polymerization, as crosslinkable units. Crosslinking at temperatures from 100° C. to 160° C. renders the impregnation highly resistant to solvents used in drycleaning and to plasticizers.

German patent 32 02 093 teaches the impregnation of textiles with acrylate-based resin dispersions free of formaldehyde and acrylonitrile, whereby improved resistance to solvents used in drycleaning and to organic plasticizers is achieved in comparison with conventional non-crosslinkable impregnations, by the inclusion of polymerized units of unsaturated carboxylic acids and of hydroxyalkyl esters of such acids. The co-use of N-methylol-acrylamide or -methacrylamide is completely dispensed with and the likelihood of formaldehyde liberation through hydrolytic decomposition of these monomers of or the polymerized units derived from them is therefore eliminated. However, the resistance to solvents and plasticizers is not as good as when self-crosslinking resin dispersions are used.

According to European patent publication 80,635, the liberation of formaldehyde from self-crosslinking aqueous resin dispersions containing N-methylolacrylamide or methacrylamide as well as hydroxyalkyl esters of unsaturated carboxylic acids as polymerized units is considerably reduced when the dispersions contain from 1 to 5 percent by weight of urea. However, some reduction of the resistance of textile finishes manufactured with such dispersions to drycleaning solvents or to plasticizers is a trade off also in this case.

A similar though somewhat lesser diminution of the resistance properties is observed in the case of textile impregnations with self-crosslinking dispersions as disclosed in European patent publication 143,175, which contain ethylene urea as a formaldehyde absorber. Other low-molecular-weight formaldehyde absorbers are described by R. S. Perry et al. in "Textile Chemists and Colorists", vol. 12 (1980), pp. 311-316, and by H. Bille and H. Petersen in "Melliand Textilberichte", vol. 57 (1976), pp. 162-165.

THE OBJECT AND THE INVENTION

The invention has as its object to provide film-forming, self-crosslinking aqueous synthetic resin dispersions which, while distinguished by low formaldehyde liberation, yield films whose resistance to solvents and plasticizers is not inferior to that of comparable dispersions without formaldehyde binding constituents. In accordance with the invention, this object is accomplished with such a resin dispersion containing an emulsion polymer composed of (A) a major portion of an ethylenically unsaturated, free-radically polymerizable monomer or monomer mixture giving a polymer or copolymer with a glass transition temperature not exceeding 120° C., (B) N-methylolacrylamide or methacrylamide, or a masked compound thereof, and, optionally (C) further ethylenically unsaturated, free radically polymerizable monomers, by further including in the emulsion polymer (D) units of an ethylenically unsaturated, free radically polymerizable monomer having therein the atomic grouping

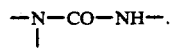

This structure will hereinafter be referred to as a ureido group. It is preferably present as a constituent of a five- or six membered heterocyclic compound. Thus, free radically polymerizable compounds of urea compounds already known to be formaldehyde absorbers are suitable.

Surprisingly, the amount of free formaldehyde and of liberatable formaldehyde contained by the resin dispersion is considerably reduced by the emulsion polymer composition of the invention, in comparison with conventional self-crosslinking resin dispersions, without a decrease in the resistance of films or textile impregnations made with the composition to organic solvents or plasticizers. In fact, these properties are improved, as the comparative tests included among the Examples will show. In contrast, the prior art use of urea evidently results in a preliminary crosslinking in the resin dispersion, as a consequence of which the methylolamide groups are no longer available for adequate crosslinking after film formation.

Experience has shown that the resistance of films from such emulsion polymers to solvents and to plasticizers is related to the density of the crosslinking bridges. The low crosslinking density of films from known self-crosslinking resin dispersions containing low-molecular-weight formaldehyde absorbers explains their reduced resistance. The consistently high resistance of films from the inventive resin dispersions by comparison with films from prior-art resin dispersions containing free formaldehyde or formaldehyde apt to be liberated indicates a consistently high crosslinking density. This may be explained by a supposed reaction of the polymer-bound ureido group with the formaldehyde to form groups which are capable of subsequent crosslinking reactions.

Units introduced into the polymer chain which have lateral ethylene urea groupings are known as constituents of emulsion polymers from German patents 1,284,006, 26 26 845 and 34 43 964. However, they have not been used up to now in an intended combination with N-methylolamides of acrylic and/or methacrylic acid. Consequently, the advantageous effect of these two monomer types has never before been observed and utilized to minimize the liberation of formaldehyde from self-crosslinking dispersions.

PRACTICE OF THE INVENTION

As monomer component (A), the composition of the emulsion polymer includes either one or several monomers whose homopolymers have glass-transition temperatures not exceeding 120° C., or a mixture of several monomers whose copolymer has a glass-transition temperature not exceeding 120° C. The first group preferably includes alkyl esters of acrylic and/or methacrylic acid having from 1 to 20 carbon atoms in the alkyl group. Preferred monomers in this group are ethyl acrylate, n-butyl acrylate and 2-ethylhexyl acrylate. Suitable for use as comonomers in component (A) are, for example, alkyl esters of methacrylic acid having from 1 to 4 carbon atoms in the alkyl group, and particularly methylmethacrylate and n-butyl methacrylate, as well as styrene and acrylonitrile. As a rule, alkyl esters of acrylic and/or methacrylic acid having from 1 to 12 carbon atoms in the alkyl group, and/or styrene, will account for more than 90 percent by weight of component (A). That component, in turn, will usually represent from 80 to 99 percent by weight of the emulsion polymer.

The self-crosslinking properties of the emulsion polymer are due to the units (B) of N-methylolacrylamide or N-methylol-methacrylamide or masked compounds thereof which it contains, and which have the same crosslinking activity when a textile impregnation made from the dispersion is heated. Derivatives of this type are, for example, the N-(lower-alkoxymethyl)amides of acrylic and/or methacrylic acid. The units (B) preferably represent from 1 to 10 percent by weight of the emulsion polymer.

The composition of the emulsion polymer may include as an additional component (C) units of further ethylenically unsaturated, free-radically polymerizable monomers. These preferably include unsaturated carboxylic acids such as acrylic and/or methacrylic acid, maleic, fumaric and itaconic acid, which may account for from 0.1 to 10 percent by weight of the emulsion polymer. Other comonomers which may be used, in amounts of from 1 to 10 percent by weight, for example, are acrylamide and/or methacrylamide, hydroxyalkyl esters of acrylic and/or methacrylic acid, and polyfunctional crosslinking monomers such as diesters of acrylic and/or methacrylic acid and diols, for example.

As component (D), the emulsion polymer will usually contain from 0.5 to 10, and preferably from 1 to 5, percent by weight of units of an ethylenically unsaturated, free-radically polymerizable monomer with the atomic grouping

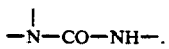

These are derivatives of urea. For their effectiveness within the meaning of the invention, at least one hydrogen atom bound to a nitrogen atom of the urea grouping is essential.

Preferred monomers (D) may be represented by the formulas (I) to (III):

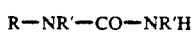    (I)

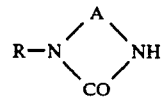    (II)

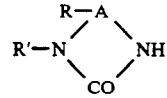    (III)

wherein R is an ethylenically unsaturated group capable of free radical polymerization, R' is a hydrogen atom or alkyl having from 1 to 8 carbon atoms, and A is an alkylene chain of 2 or 3 carbon atoms which may be substituted by lower alkyl and/or interrupted by carbonyl. Monomers of the formulas (II) or (III) which are derived from ethylene urea or propylene urea are preferred.

The ethylenically unsaturated group R which is capable of free radical polymerization may be a vinyl, allyl, methallyl, acryloyl, methacryoyl, 2-vinyloxyethyl, 2-acrylamidoethyl, 2-methacrylamidoethyl, or 2-(β-carboxyacrylamido)ethyl group. R preferably has the structure

wherein R" is hydrogen or methyl and Alk is an alkylene chain having from 2 to 8 carbon atoms.

Preferred monomers (D) are:
N-(2-Methacryloyloxyethyl)ethylene urea
N-(2-Methacryloxyacetamidoethyl)-N,N'-ethylene urea
N-Methacrylamidomethyl urea
N-Methacryloyl urea
N-(3-[1,3-Diazacyclohexan-2-on]-propyl)methacrylamide.

The emulsion polymer may be produced by commonly used methods of emulsion polymerization in the aqueous phase in the presence of water-soluble anionic, cationic or nonionic emulsifiers, or of protective colloids, and of water-soluble free-radical-forming initiators, such as alkali-metal persulfates, at temperatures of from 20° to 100° C. The mixture of the monomers (A) to (D) may be emulsified in the aqueous phase before the start of the polymerization or gradually added to the initially introduced water phase during the polymerization on the basis of the conversion, either as is or as an aqueous emulsion.

In a preferred embodiment of the invention, the emulsion polymer comprises at least two different polymer phases, one of which contains the major portion of component (B) and the other the major portion of component (D). Preferably, from 90 to 100 percent by weight of component (B) is contained in one phase, and from 90 to 100 percent by weight of component (D) in the other phase. The components (A) and (D) may be contained in the two phases in the same or similar percentages by weight. "Phase" here means a portion of the emulsion polymer which is produced in a time interval of limited duration during the emulsion polymerization and whose composition differs from that of the preceding or succeeding phase. This is also referred to as multistage emulsion polymerization or graft polymerization. The phases may form in each latex particle a spherical core and one or more shells surrounding the core, but such a structure has neither been established nor is it actually required for the emulsion polymers of the invention. However, it is assumed that in each case the phases form domains which are physically separated from but touch one another. When the emulsion polymer is made up of more than two phases, component (B) should be contained largely or completely in the phase produced first, and component (D) largely or completely in the phase produced last.

It has been found that the advantageous effect of the components (B) and (D) is intensified by their separation into two phases. It is hypothesized that the probability of crosslinking reactions occurring between the reactive groups of the units (B) and (D) of a given latex particle is reduced and the probability of crosslinking reactions taking place between different latex particles increased thereby. Moreover, the probability that the units (D) will react with free formaldehyde increases relative to the probability that they will react with polymer-bound units (B). These effects promote the binding of free formaldehyde to the polymer and its utilization in crosslinking, as well as the formation of crosslinking bridges between different latex particles, which contribute to the strengthening of the film and to its resistance to solvents and swelling agents.

In the phase produced first (the core), the emulsion polymer preferably contains from 2 to 12 percent by weight of units (B) and optionally up to 10 percent by weight of units of acrylamide and/or methacrylamide, and in the phase produced last (the shell), from 0.5 to 10 percent by weight of units (D), these percentages being based on the total weight of the emulsion polymer. The quantity ratio of the first phase to the last may range from 1:1 to 10:1. A ratio of from 2:1 to 6:1 is preferred.

The new synthetic resin dispersions can be produced with solids contents of from 30 to 65 percent by weight, for example, but may be diluted to solids contents of from 10 to 30 percent by weight, for example, before they are used to impregnate fibers. In the undiluted state, their viscosity may range from 50 to 50,000 mPa.s. As a rule, they contain from 0.1 to 5 percent by weight of emulsifiers and/or protective colloids, preferably mixtures of anionic and nonionic emulsifiers. What is the general practice in the field of emulsion polymerization may, of course, be judiciously applied also to the production of the new resin dispersions. This is true, for example, of the inclusion of specific comonomers, the control of molecular weight, particle size and particle size distribution, including polymodal states of distribution, or the adoption of known measures for improvement of the agitating stability, the pigmenting capability or the frost resistance.

USE OF THE RESIN DISPERSIONS

The synthetic resin dispersions of the invention are capable of forming films at temperatures ranging from 0° to 120° C. To facilitate film formation, commonly used film-forming aids, such as volatile solvents or difficultly volatile plasticizers for the emulsion polymer, may be added to the resin dispersion. The resin dispersions may be used like conventional film-forming, self-crosslinking aqueous resin dispersions for the finishing of fiber products. By fiber products are meant woven fabrics, knitted fabrics and nonwovens made of natural or synthetic fibers, and particularly of cotton, rayon staple, viscose, cellulose acetate, polyester, polyamide, polyacrylonitrile or polypropylene, or blends of such fibers. The resin dispersion is applied to the fiber product by dipping, spraying, padding, knife coating or printing, for example, in an amount of from 5 to 100 percent by weight, for example, calculated as dry product and based on the fiber weight. To this end, the dispersion may be mixed with acid catalysts, such as paratoluenesulfonic acid, citric acid, phosphoric acid or ammonium phosphate, and with dyes or pigments, and adjusted with water or thickeners to the viscosity required for its use, and foamed, if desired. After drying, the impregnation so obtained is crosslinked at temperatures between 100° and 160° C. over a period ranging from 180 to 30 seconds. In this way, finished fiber products having outstanding resistance to the solvents used in drycleaning and to plasticizers which when the fiber product is in constant contact with flexible polyvinyl chloride or other highly plasticized materials tend to migrate into the impregnation.

The lower content of free formaldehyde or formaldehyde apt to be liberated manifests itself as a distinct advantage in all processing steps from production of the dispersion, its storage, transportation and formulation to impregnation, drying and condensation. In all processing steps, much less formaldehyde is given off to the ambient atmosphere.

A better understanding of the present invention and of its many advantages will be had from the following specific Examples, given by way of illustration.

EXAMPLES

Example 1

In a 2-liter reaction vessel equipped with a reflux condenser, a stirrer and an inlet vessel, 0.18 g of the sodium salt of sulfated triisobutylphenol polyglycol ether (degree of ethoxylation: 7) and 0.36 g of ammonium persulfate were dissolved in 360 g of desalted water at 20° C.

To this solution there were successively added two emulsions at 80° C. with stirring. Emulsion I, composed of 603.0 g of ethyl acrylate [which alone produces a homopolymer having a glass transition temperature of −22° C.]
27.0 g of methacrylamide,
45.0 g of N-methylol methacrylamide,
10.13 g of the sodium salt of sulfated triisobutylphenol polyglycol ether,
1.62 g of ammonium persulfate, and
420.0 g of water, was added within 3 hours. Immediately thereafter, emulsion II, composed of 198.0 g of ethyl acrylate, 27.0 g of N-(2-methacryloyloxyethyl)ethylene urea, 3.38 g of the sodium salt of sulfated triisobutylphenol polyglycol ether, 0.54 g of ammonium persulfate, and 135.0 g of water,
was metered in over the next hour.

At the end of this addition, the batch was cooled to room temperature and 0.38 g of 1,4-diisopropylbenzene hydroperoxide and 0.3 g of sodium formaldehyde sulfoxylate were added at 70° C. The dispersion was then filtered. The dry solids content of the dispersion was about 50%.

For a characterization of the dispersion, refer to Table 1.

The dispersion had a pH of 2.3 and a Brookfield viscosity of 1625 mPa.s. The average size of the latex particles was 170 nm.

EXAMPLE 2

By the procedure described in Example 1, a resin dispersion having the following composition was prepared.

Core:
89.3 wt. % of ethyl acrylate,
6.7 wt. % of N-methylol methacrylamide, and
4.0 wt. % of methacrylamide
Shell:
92.4 wt. % of ethyl acrylate, and
7.6 wt. % of N-(2-methacryloyloxyethyl)ethylene urea The dispersion had a pH of 2.3 and a Brookfield viscosity of 1750 mPa.s. The average size of the latex particles was 150 nm.

COMPARATIVE EXAMPLE 1

An emulsion polymer having almost the same gross composition as the one of Example 1 but without the ethylene urea monomer was produced in a single stage process from an emulsion of
828.0 g of ethyl acrylate,
45.0 g of methacrylamide,
27.0 g of N-methylol methacrylamide
13.5 g of the sodium salt of sulfated triisobutylphenol polyglycol ether,
2.16 g of ammonium persulfate, and
555.0 g of water
during a 4 hour emulsion feed. In other respects, the procedure was the same as that followed in the first stage and the workup in Example 1.

The dispersion had a pH of 2.4 and a Brookfield viscosity of 1500 mPa.s. The average size of the latex particles was 140 nm.

EXAMPLE 3

In a 2-liter reaction vessel equipped with a reflux condenser, a stirrer and an inlet vessel, 0.09 g of the sodium salt of sulfated triisobutylphenol polyglycol ether (degree of ethoxylation: 7) and 0.15 g of ammonium persulfate were dissolved in 411 g of desalted water at 20° C.

To this solution, two emulsions were successively added at 80° C. with stirring. Emulsion I, composed of
372.6 g of butyl acrylate,*
263.9 g of methyl methacrylate,*
23.64 g of N-methylol methacrylamide,
6.07 g of methacrylamide,
8.77 g of glycol dimethacrylate,
3.38 g of the sodium salt of sulfated triisobutylphenol polyglycol ether,
1.13 g of ammonium persulfate, and
346.0 g of water,
* [this monomer mixture alone gives a copolymer having a glass transition temperature between −3° C. and −7° C.]
was added over a period of 3 hours. Then emulsion II, composed of
108.45 g of butyl acrylate,
89.55 g of methyl methacrylate,
27.0 g of N-(2-methacryloyloxyethyl)ethylene urea,
1.13 g of the sodium salt of sulfated triisobutylphenol polyglycol ether,
0.38 g of ammonium persulfate, and
150.0 g of water,
was metered in within 1 hour.

The dispersion had a pH of 1.8 and a Brookfield viscosity of 55 mPa.s. The average size of the latex particles was 285 nm.

EXAMPLE 4

By the procedure described in Example 3, a resin dispersion having the following composition was prepared.

Core:
55.2 wt. % of butyl acrylate,*
39.1 wt. % of methyl methacrylate,*
3.5 wt. % of N-methylol acrylamide,
0.9 wt. % of methacrylamide, and
1.3 wt. % of glycol dimethacrylate
* [this monomer mixture alone gives a copolymer having a glass transition temperature between −3° C. and −7° C.]
Shell:
56.2 wt. % of butyl acrylate,
39.8 wt. % of methyl methacrylate, and
4.0 wt. % of N-(2-methacryloyloxyethyl)ethylene urea The dispersion had a pH of 1.9 and a Brookfield viscosity of 180 mPa.s. The average size of the latex particles was 276 nm.

COMPARATIVE EXAMPLE 2

An emulsion polymer having almost the same gross composition as the one of Example 3 but without the ethylene urea monomer was produced in a single stage process from an emulsion of
508.5 g of butyl acrylate,
353.25 g of methyl methacrylate,
23.4 g of N-methylol methacrylamide,
5.85 g of methacrylamide,
9.0 g of glycol dimethacrylate,
4.5 g of the sodium salt of sulfated triisobutylphenol polyglycol ether,
1.5 g of ammonium persulfate, and
496.0 g of water
during a 4-hour emulsion feed. In other respects, the procedure was the same as the one followed in the first stage and the workup in Example 3.

The dispersion had a pH of 1.9 and a Brookfield viscosity of 42 mPa.s. The average size of the latex particles was 315 nm.

The results obtained in the above examples and comparative examples are presented in Tables 1 and 2. Table 1 gives the properties of the resin dispersions, including the values for free formaldehyde and for formaldehyde apt to be liberated from the dispersion when the latter is heated.

Table 2 presents the results of in-use tests of the resin dispersions. In these tests, polyester fabrics were impregnated with the dispersions, squeegeed, and dried at 80° C. or 120° C. In each case, the binder content amounted to from 40 to 50% of the fiber weight.

METHODS OF ANALYSIS

Free formaldehyde in the dispersion is determined by diluting the latter with from 6 to 8 times as much water, adding a hydroxylammonium chloride solution of pH 2.9, and titrating the liberated hydrochloric acid after 20 minutes. One mol of hydrochloric acid corresponds to one mol of formaldehyde. (Percentage based on weight of dispersion.)

Liberatable formaldehyde is the total amount of free formaldehyde and formaldehyde bound in the form of N-methylolamides, to the extent that it is liberated on heating. A sample of the dispersion is mixed with quartz sand and heated to 140° C. within 15 minutes. The formaldehyde liberated as a gas is determined. (Percentage based on weight of dispersion.)

The losses of binder in the treatment of the impregnated test fabric with acetone (acetone-treatment binder losses) or in washing with boiling water (boiling-wash binder losses) are given for drying temperatures of the test fabric of 80° C. and 120° C. For determination of the acetone-treatment binder losses, the fabric samples are treated for 20 minutes in a laboratory laundering apparatus with acetone at 20° C., rinsed with trichloroethylene, and dried at 80° C., the weight loss then being determined in percent, based on the binder content.

For determination of the boiling-wash binder losses, the impregnated fabric samples are washed for 10 minutes in a laboratory laundering apparatus in soapsuds at 90° C., rinsed and dried, the weight loss then being determined in percent, based on the binder content.

The water absorption and the swelling by methyl isobutyl ketone (MIBK) are determined on a film 0.5 mm thick, produced on drying of a sample of the dispersion under investigation at from 40° to 80° C. (depending on the minimum film-forming temperature of the dispersion) and condensation for 5 minutes at 140° C. The film is allowed to swell at 20° C. for 30 minutes and 4 hours, respectively, in water and in MIBK, and blotted, the weight increase then being determined in percent.

EVALUATION OF RESULTS

The resin dispersions of the invention used in Examples 1 to 4 were consistently lower in free formaldehyde and formaldehyde apt to be liberated than the comparative dispersions 1 and 2 without ureido groups. Yet the results which they produced in the in-use tests were not inferior to those of the comparative dispersions; in fact, in some respects they were significantly better. The acetone-treatment and boiling-wash binder losses indicate the degree of crosslinking of the impregnation. The better the crosslinking, the lower the binder losses. Similarly, the better the polymer is crosslinked, the lower the swelling of the films in MIBK.

What is claimed is:

1. A film-forming, self-crosslinking aqueous synthetic resin dispersion containing an emulsion polymer comprising
   (A) a major portion of at least one ethylenically unsaturated, free radically polymerizable monomer which monomer or monomers, when polymerized alone, give a polymer or copolymer having a glass transition temperature not greater than 120° C.,
   (B) a member selected from the group consisting of N-methylolacrylamide, N-methylolmethacrylamide, and masked compounds thereof, and
   (D) an ethylenically unsaturated, free radically polymerizable monomer containing the atomic grouping

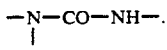

2. A resin dispersion as in claim 1 wherein said polymer additionally comprises at least one further ethyleni-

TABLE 1

| Example No. | Polymer Composition (weight percent) | | | | | pH | Brookfield Viscosity (mPa·s) | Particle Diameter (nm) | Formaldehyde Free Liberatable (ppm) | |
| --- | --- | --- | --- | --- | --- | --- | --- | --- | --- | --- |
| | A | B | C | D | C | | | | | |
| 1 | EA | MMAm | MAm | MEH | | 2.3 | 1625 | 170 | 150 | 580 |
| Gr: | 89 | 5 | 3 | 3 | | | | | | |
| C: | 89.3 | 6.7 | 4 | — | | | | | | |
| S: | 88 | — | — | 12 | | | | | | |
| 2 | EA | MMAm | MAm | MEH | | 2.3 | 1750 | 150 | 450 | 1040 |
| Gr: | 90.1 | 5 | 3 | 1.9 | | | | | | |
| C: | 89.3 | 6.7 | 4 | — | | | | | | |
| S: | 92.4 | — | — | 7.6 | | | | | | |
| Comp. 1 | EA | MMAm | MAm | | | 2.4 | 1500 | 140 | 880 | 1330 |
| | 92 | 5 | 3 | | | | | | | |
| 3 | BA | MMA | MMAm | MAm | MEH | GDA | 1.8 | 55 | 285 | 320 | 440 |
| Gr: | 53.5 | 39.25 | 2.6 | 0.65 | 3 | 1 | | | | |
| 75% C: | 55.2 | 39.1 | 3.8 | 0.9 | — | 1.3 | | | | |
| 25% S: | 48.2 | 39.8 | — | — | 12 | — | | | | |
| 4 | BA | MMA | MMAm | MAm | MEH | GDA | 1.9 | 180 | 275 | 550 | 570 |
| Gr: | 55.5 | 39.25 | 2.6 | 0.65 | 1 | 1 | | | | |
| 75% C: | 55.2 | 39.1 | 3.5 | 0.9 | — | 1.3 | | | | |
| 25% S: | 56.2 | 39.8 | — | — | 4 | — | | | | |
| Comp. 2 | BA | MMA | MMAm | MAm | | GDA | 1.9 | 42 | 315 | 790 | 890 |
| Gr: | 56.3 | 39.25 | 2.6 | 0.65 | | 1 | | | | |

EA = Ethyl Acrylate
BA = Butyl Acrylate
MMA = Methyl Methacrylate
MMAm = N-methylolmethacrylamide
MAm = Methacrylamide
MEH = N-(2-methacryloyloxyethyl)ethylene urea
GDA = Glycol Dimethacrylate
Gr = Gross composition
C = Core phase compn.
S = Shell phase compn.

TABLE 2

| | Properties of Finished Textiles | | | | | |
| --- | --- | --- | --- | --- | --- | --- |
| | Acetone-treatment binder losses % | Boiling-wash binder losses % | Water absorption | | MIBK absorption | |
| Example | | | 0.5 hr. % | 4 hr. % | 0.5 hr. % | 4 hr. % |
| 1 | 2.6/1 | 2.8/1 | 2.7 | 5.2 | 57 | 75 |
| 2 | 2.7/1 | 1.6/<1 | 2.8 | 5.5 | 67 | 78 |
| Comp. 1 | 3.7/1 | 2.7/<1 | 1.4 | 3.4 | 78 | 92 | cally unsaturated, free radically polymerizable monomer, (C), different from (A), (B), and (D).

3. A resin dispersion as in claim 1 wherein said emulsion polymer comprises at least two different polymer phases, namely a first-produced core phase which contains the major portion of component (B) and a second-produced shell phase which contains the major portion of component (D).

4. A resin dispersion as in claim 3 wherein said core phase contains from 2 to 12 percent by weight of (B) and from 0 to 10 percent by weight of at least one member selected from the group consisting of acrylamide and methacrylamide, and said shell phase contains from 0.5 to 10 percent by weight of (D).

5. A resin dispersion as in claim 1 wherein component (D) is a member selected from the group of compounds of the formulas

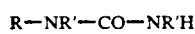    (I)

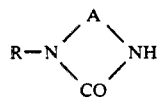    (II)

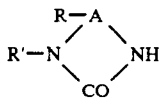    (III)

wherein R is an ethylenically unsaturated group capable of free radical polymerization, R' is a hydrogen atom or alkyl having from 1 to 8 carbon atoms, and A is an alkylene chain of 2 or 3 carbon atoms which may be substituted by lower alkyl and/or interrupted by carbonyl.

6. A resin dispersion as in claim 5 wherein R in said formulas (I)-(III) has the structure

wherein R'' is hydrogen or methyl and Alk is an alkylene chain having from 2 to 8 carbon atoms.

7. A Resin dispersion as in claim 5 wherein the monomers having formula (II) and (III) are derived from ethylene urea or propylene urea.

8. A resin dispersion as in claim 1 wherein component (A) comprises more than 90 percent by weight of at least one member selected from the group consisting of styrene and alkyl esters of acrylic acid or of methacrylic acid having from 1 to 12 carbon atoms in the alkyl portion thereof.

* * * * *